(12) United States Patent
Hassey

(10) Patent No.: US 10,249,996 B2
(45) Date of Patent: Apr. 2, 2019

(54) TELEVISION COMMERCIAL SILENCER ELECTRICAL WALL OUTLET RECEPTACLE TAP

(71) Applicant: Richard Jon Hassey, Punta Gorda, FL (US)

(72) Inventor: Richard Jon Hassey, Punta Gorda, FL (US)

( * ) Notice: Subject to any disclaimer, the term of this patent is extended or adjusted under 35 U.S.C. 154(b) by 0 days.

(21) Appl. No.: 15/732,655

(22) Filed: Dec. 8, 2017

(65) Prior Publication Data

US 2018/0191111 A1  Jul. 5, 2018

Related U.S. Application Data

(60) Provisional application No. 62/498,708, filed on Jan. 4, 2017.

(51) Int. Cl.
| | | |
|---|---|---|
| *H04R 27/00* | (2006.01) | |
| *H01R 25/00* | (2006.01) | |
| *G10L 17/22* | (2013.01) | |
| *G10K 11/34* | (2006.01) | |
| *H01R 27/02* | (2006.01) | |
| *H01R 13/66* | (2006.01) | |

(52) U.S. Cl.
CPC ......... *H01R 25/006* (2013.01); *G10K 11/345* (2013.01); *G10L 17/22* (2013.01); *H01R 25/003* (2013.01); *H01R 27/02* (2013.01); *H01R 13/6658* (2013.01); *H01R 2201/18* (2013.01)

(58) Field of Classification Search
CPC ..................................................... H04R 27/00
See application file for complete search history.

(56) References Cited

U.S. PATENT DOCUMENTS

| | | | | | |
|---|---|---|---|---|---|
| 3,928,737 | A | * | 12/1975 | Prasert ................. | H01R 13/703 200/51 LM |
| 4,267,460 | A | * | 5/1981 | Habighorst ............ | H01H 19/58 200/1 R |
| 4,413,211 | A | * | 11/1983 | Fowler .................... | H02P 23/24 318/257 |
| 4,620,071 | A | * | 10/1986 | Rushansky .......... | H01H 23/168 200/339 |

(Continued)

*Primary Examiner* — Olisa Anwah
(74) *Attorney, Agent, or Firm* — Edward M. Livingston, Esq.; Bryan L. Loeffler, Esq.; Livingston Loeffler, P.A.

(57) ABSTRACT

I rewired a standard one gang electrical outlet receptacle with an 110/120 volt three position toggle switch (ON, OFF, ON). The rewiring allowed for the top outlet to be hot when the toggle was up (ON) and the bottom outlet would be OFF. Conversely, the bottom outlet would be hot when the toggle was down (ON) and the top outlet would be OFF. When the toggle switch was flipped to the middle position (OFF), both outlets would be off. Plugged a 3.5 mm plug from a set of amplified external speakers into my headphone port on the side of my television. The external speakers were plugged into the top outlet on my rewired receptacle. The bottom outlet on my rewired receptacle provided power to my "BOOM BOX." Flipping my three position toggle switch up turned on my television audio while flipping the toggle switch down would "Silence" my television audio and turn on my "BOOM BOX" radio.—My rewired receptacle is the origin of the Television Commercial Silencer Electrical Wall Outlet Receptacle Tap.

8 Claims, 13 Drawing Sheets

(56) References Cited

U.S. PATENT DOCUMENTS

| | | | | |
|---|---|---|---|---|
| 4,978,318 | A * | 12/1990 | Wiley | H01R 25/006 |
| | | | | 174/54 |
| 5,708,477 | A * | 1/1998 | Forbes | G11B 15/087 |
| | | | | 348/552 |
| 6,538,202 | B1 * | 3/2003 | Shaffer | H02G 3/00 |
| | | | | 174/66 |
| 6,984,057 | B1 * | 1/2006 | Rogers | A47B 81/06 |
| | | | | 362/125 |
| 9,369,767 | B2 * | 6/2016 | Hjelmstedt | H04N 21/6175 |
| 2002/0195324 | A1 * | 12/2002 | Lee | C08J 9/0004 |
| | | | | 200/51.03 |
| 2004/0019905 | A1 * | 1/2004 | Fellenstein | H04N 7/163 |
| | | | | 725/32 |
| 2007/0266400 | A1 * | 11/2007 | Rogers | H04N 7/162 |
| | | | | 725/42 |
| 2008/0041708 | A1 * | 2/2008 | James | H01H 23/20 |
| | | | | 200/5 R |
| 2009/0146494 | A1 * | 6/2009 | Mori | G06F 1/266 |
| | | | | 307/38 |
| 2011/0141647 | A1 * | 6/2011 | Garcia | H01H 23/145 |
| | | | | 361/166 |
| 2013/0152126 | A1 * | 6/2013 | Shkedi | H04N 21/812 |
| | | | | 725/34 |
| 2014/0334640 | A1 * | 11/2014 | Chan | G06F 1/266 |
| | | | | 381/98 |
| 2017/0325005 | A1 * | 11/2017 | Liassides | H04N 21/25841 |

* cited by examiner

Television Commercial Silencer Electrical Wall Outlet Receptacle Tap.

Side View of Television Commercial Silencer
Electrical Wall Outlet Receptacle Tap.

Remote Control for Television Commercial
Silencer Wall Outlet Receptacle tap.

Television Commercial Silencer Electrical Wall Outlet Receptacle Tap Function Numbering.

Side View of Television Commercial Silencer Electrical Wall Outlet Receptacle Tap Function Numbering.

30

Remote Control Button Assignments for Television Commercial Silencer Electrical Wall Outlet Receptacle Tap Function Numbering.

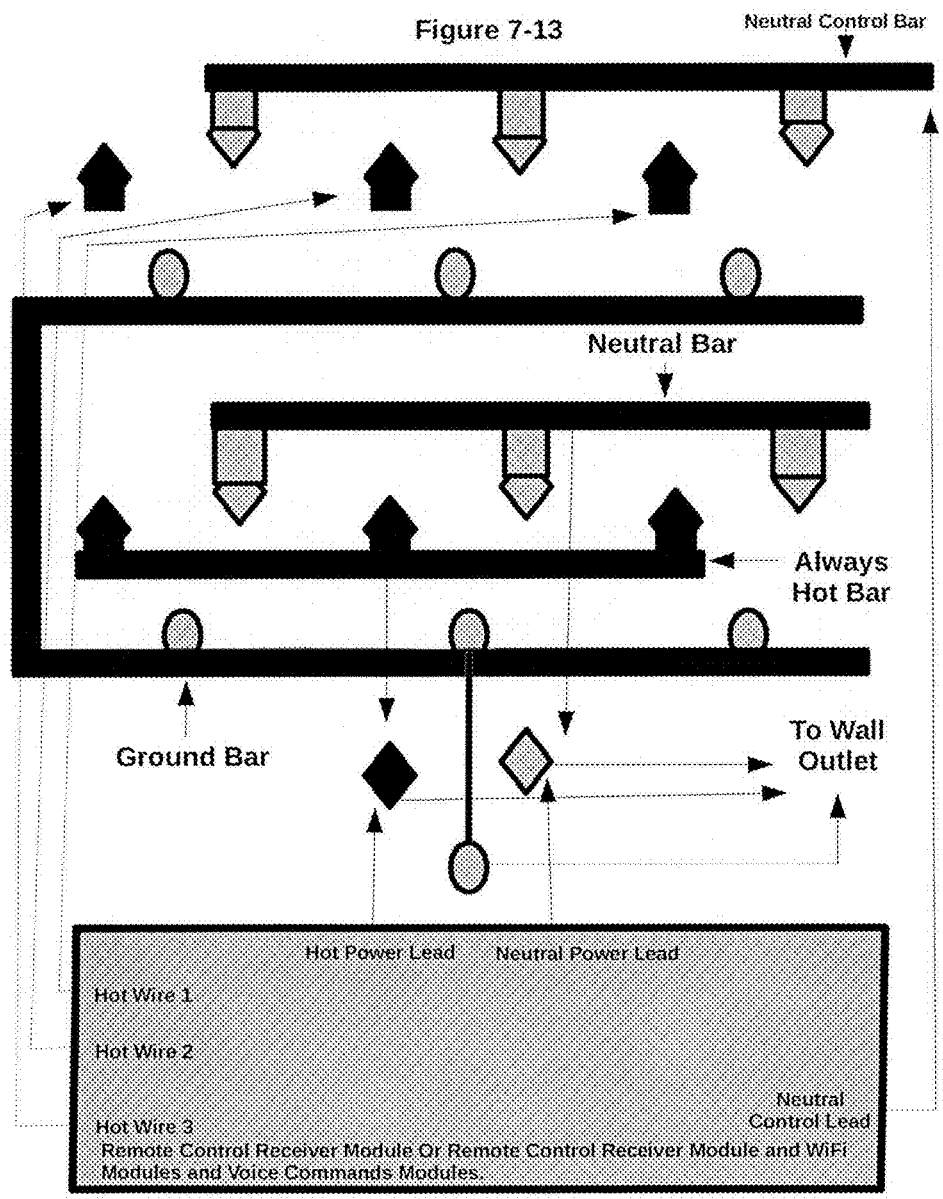

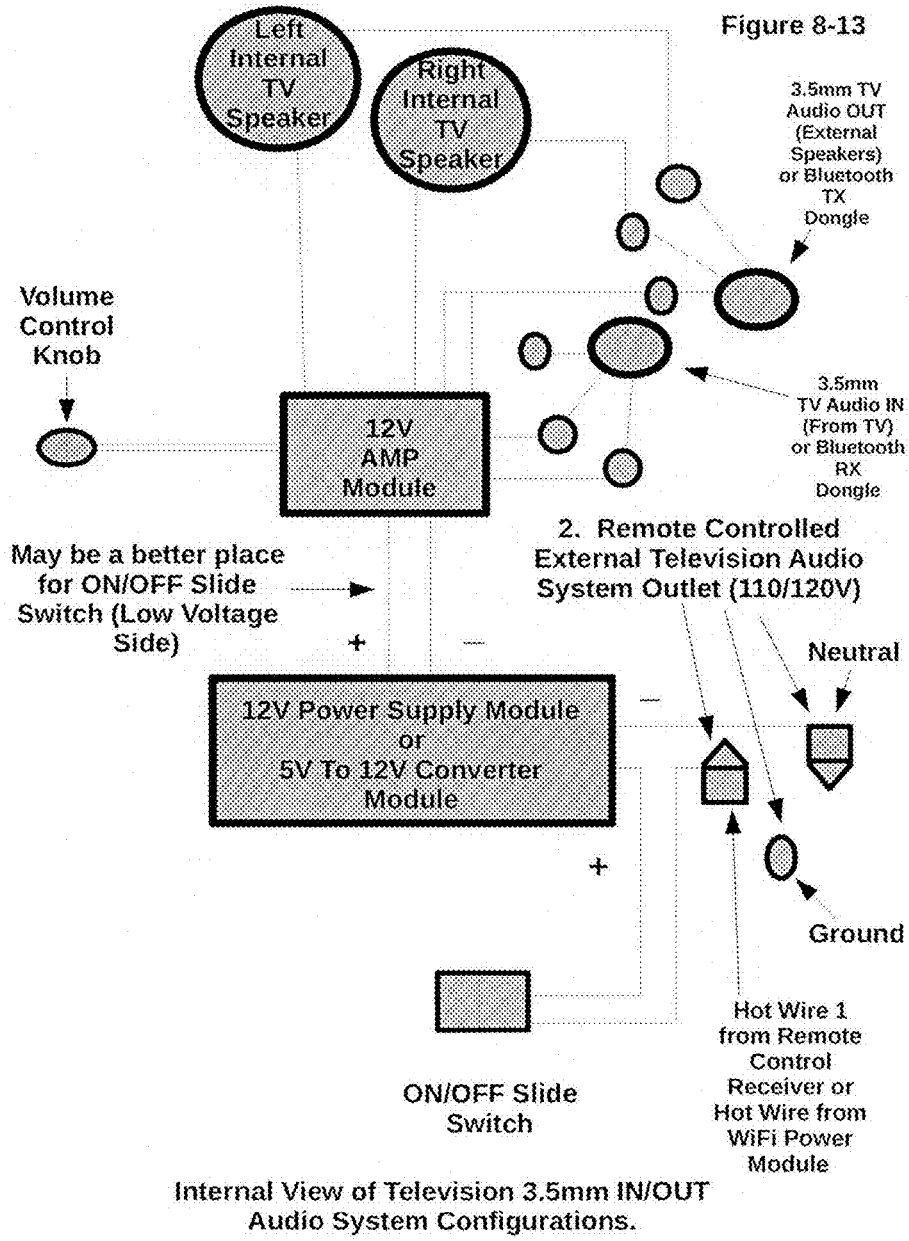

Internal View of FM Radio Audio System Configurations.

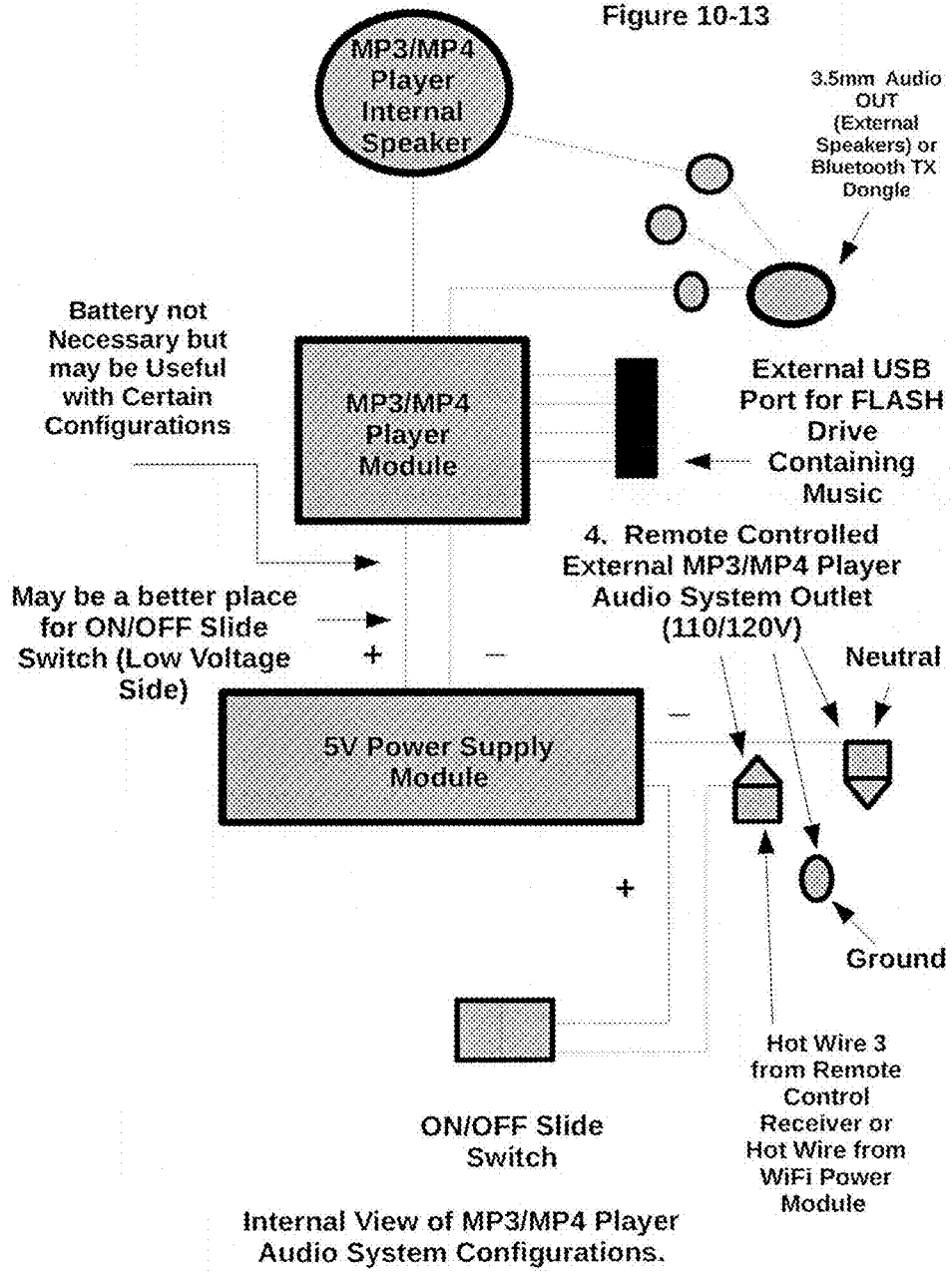

Internal View of Television RCA or Component IN Audio System Configurations.

Internal View of Television Optical IN/OUT Audio System Configurations.

TELEVISION COMMERCIAL SILENCER ELECTRICAL WALL OUTLET RECEPTACLE TAP

BRIEF SUMMARY OF THE INVENTION

Television Commercial Silencer Electrical Wall Outlet Receptacle Tap is a small user friendly device that gives one the convenient ability NOT to "mute" but to "silence" television commercials while at the same time enabling an audio system of their own choosing.

BACKGROUND OF THE INVENTION

In an attempt to eliminate the bombardment of irrelevant commercials that one is exposed to on a daily bases, while staying within a budget, I rewired a standard one gang electrical outlet receptacle with an 110/120 volt three position toggle switch (ON, OFF, ON). The rewiring allowed for the top outlet to be hot when the toggle was up (ON) and the bottom outlet would be OFF. Conversely, the bottom outlet would be hot when the toggle was down (ON) and the top outlet would be OFF. When the toggle switch was flipped to the middle position (OFF), both outlets would be off.

With this newly rewired receptacle, I was able to insert the 3.5 mm plug from a set of amplified external speakers into my headphone port on the side of my television. The external speakers were provided power by plugging their AC adapter into the top outlet on my rewired receptacle. The bottom outlet on my rewired receptacle provided power to my "BOOM BOX." Flipping my three position toggle switch up turned on my television audio while flipping the toggle switch down would "Silence" my television audio and turn on my "BOOM BOX" radio.—My rewired receptacle is the origin of the Television Commercial Silencer Electrical Wall Outlet Receptacle Tap.

As time went on and the "benefits" of silencing burdensome television commercials became apparent to me, it was noticed that tethering to a toggle switch was inconvenient. Therefore, I took my same rewired outlet receptacle and I added some more electronics to the work box (Wireless Receiver Module). Adding the wireless receiver module with a hand held remote control allowed for silencing television commercials from anywhere in my home and turning on the radio at the same time.

After noticing that at times there were just as many commercials on the radio as on the television, I plugged my MP3 player into the bottom outlet of my rewired receptacle instead of my radio. My MP3 player was so small that I thought that it might just fit inside my rewired receptacle work box—it did!

The possibilities began to unfold and I was determined to "shove" a radio inside my rewired receptacle work box as well. However, a single gang outlet receptacle work box can only hold so much "stuff."—Went to a two gang and then a three gang outlet receptacle work box, increasing size as space was needed for the components. Added receptacles and wiring and electronics as space permitted.

My one gang, two gang and three gang "Television Commercial Silencers" all work great! Some of them provide more features and functions then others (My 3 gang work box even has WiFi modules so that the unit's remote controlled outlets can be controlled from a Smart Phone) (Implying, there will be: "An APP for that"—Inclusion of the Voice Commands API during APP development will allow for Voice Control of the Television Commercial Silencer Electrical Wall Outlet Receptacle Tap [Online and Offline Modes are desirable] and technology such as "Bluetooth Smart" during APP development will allow for Auto Detection and Configuration of audio devices near by the Television Commercial Silencer Electrical Wall Outlet Receptacle Tap) but they all do what they were designed to do: Silence television commercials while at the same time turning on NOT just a radio but an audio device of one's own choosing, including a computer's audio system. However, the work boxes started to become bulky and complex; hence, the birth of the user friendly Television Commercial Silencer Electrical Wall Outlet Receptacle Tap.

BRIEF DESCRIPTION OF THE DRAWINGS

Having described the origin, birth and nature of the Television Commercial Silencer Electrical Wall Outlet Receptacle Tap in general terms, reference will now move to the included drawings.

These drawings are not to scale and consist of thirteen figures, each on their own page. The figures go from general to specific and provide enough details for any person in the electrical or electronics industry to manufacturer the device.

Figures 1, 2, 3, 4, 5, 6, 7, 8, 9, 10, 11, 12, 13:
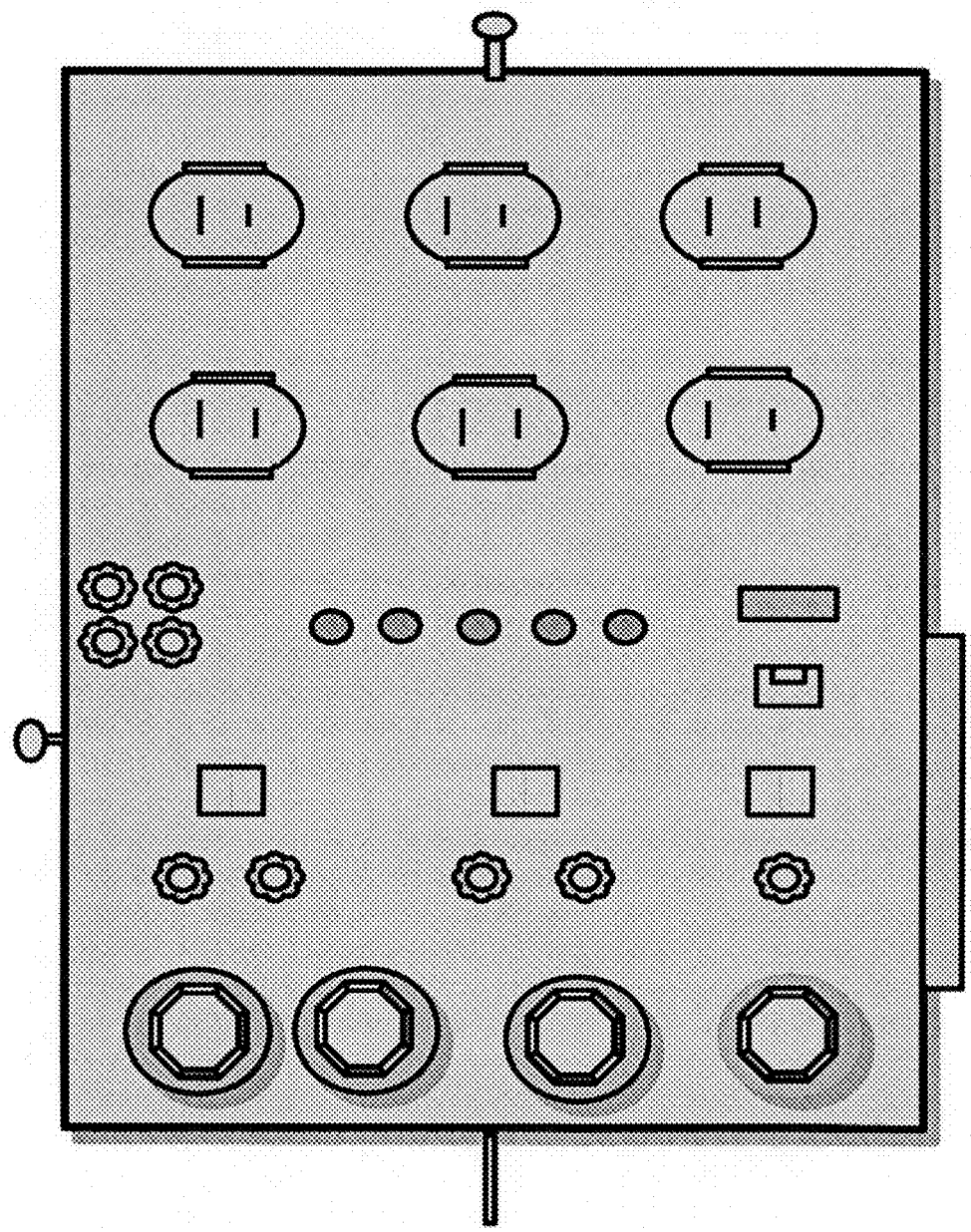
Figures 2, 3, 4, 5, 6, 7, 8, 9, 10, 11, 12, 13:
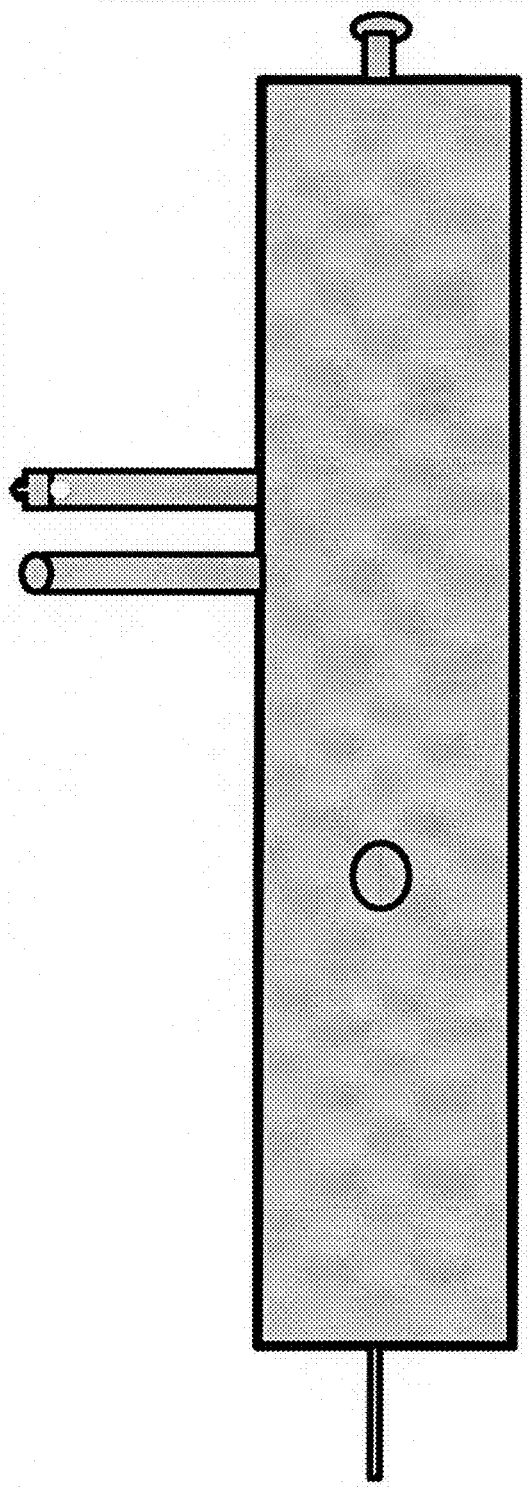
Figures 3, 4, 5, 6, 7, 8, 9, 10, 11, 12, 13:
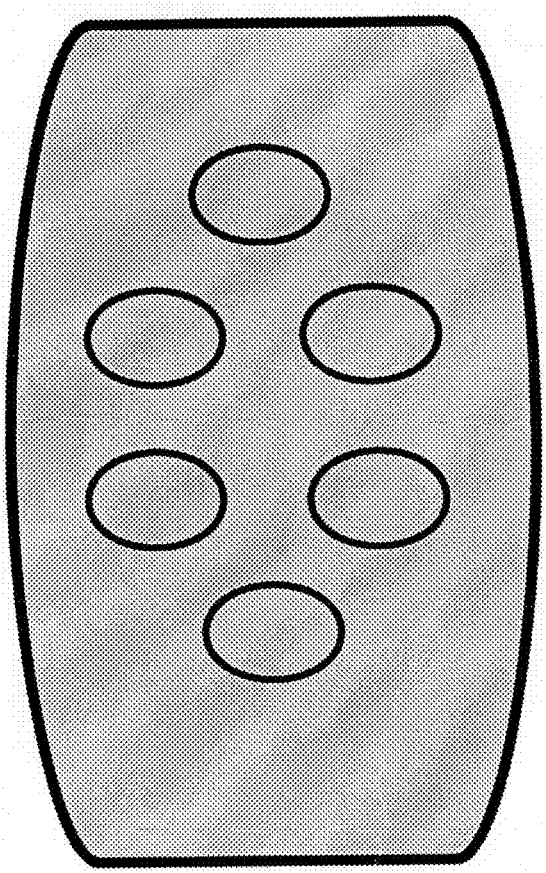
Figures 4, 5, 6, 7, 8, 9, 10, 11, 12, 13:
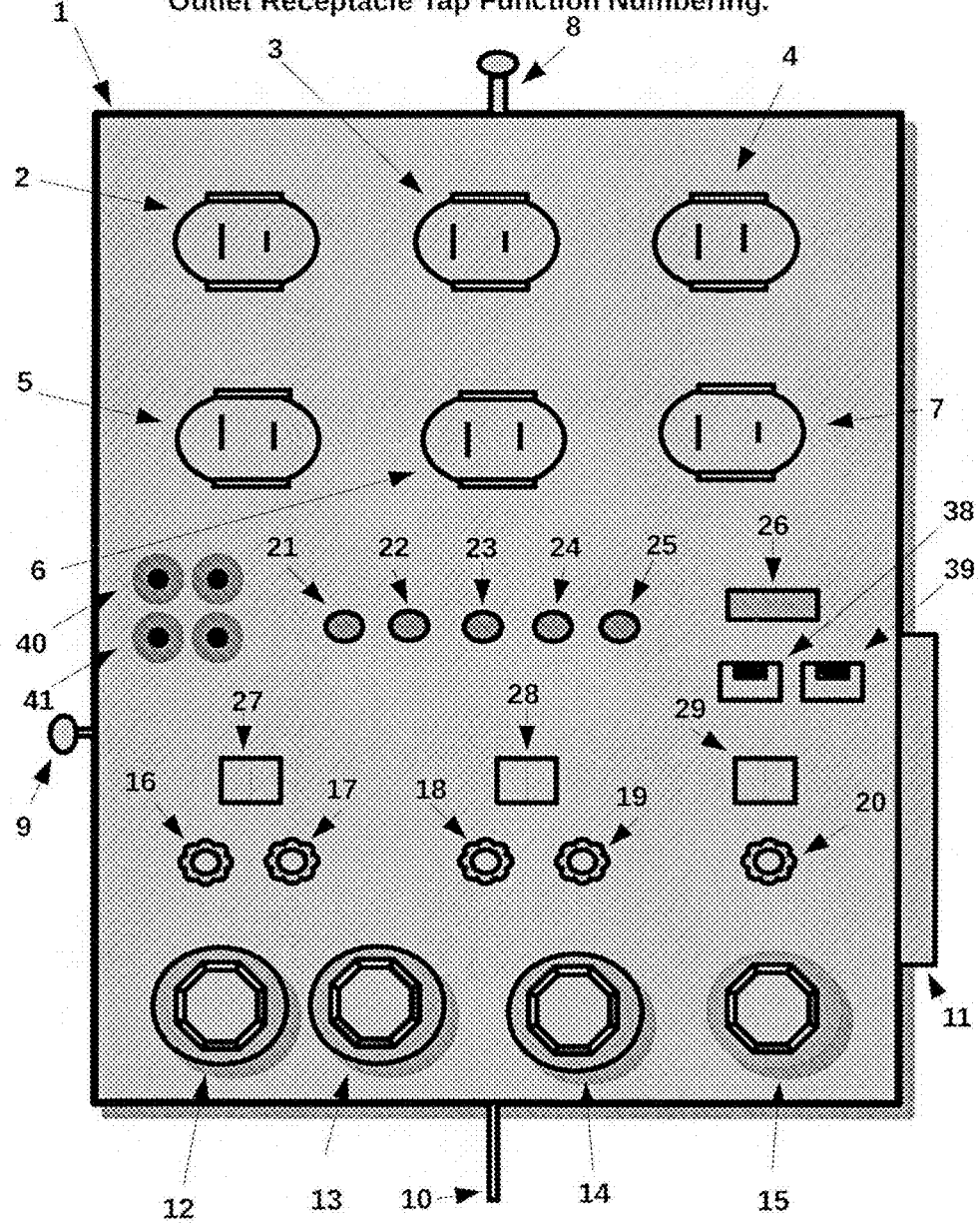
Figures 5, 6, 7, 8, 9, 10, 11, 12, 13:
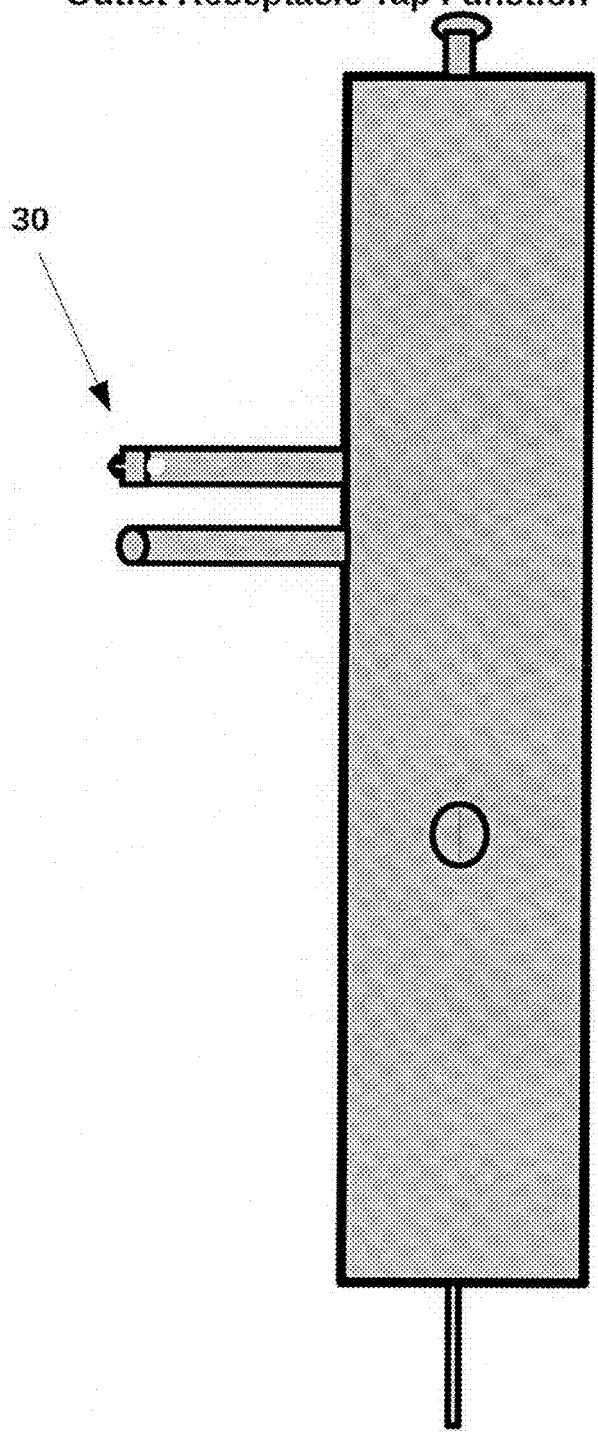
Figures 6, 7, 8, 9, 10, 11, 12, 13:
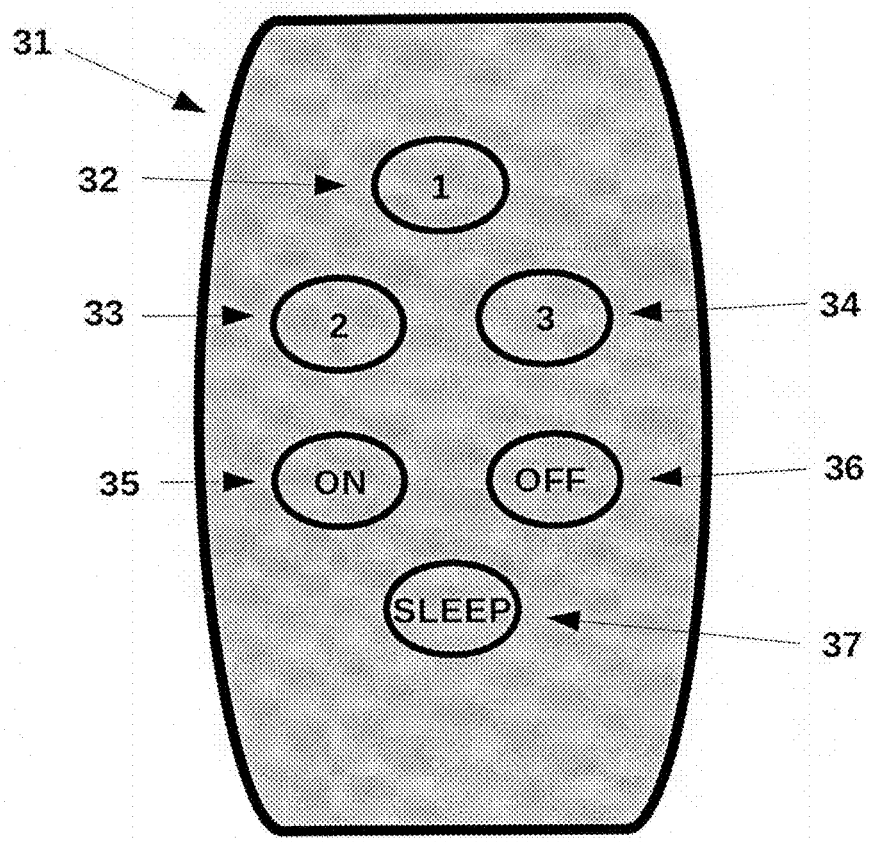
Figures 9, 10, 11, 12, 13:
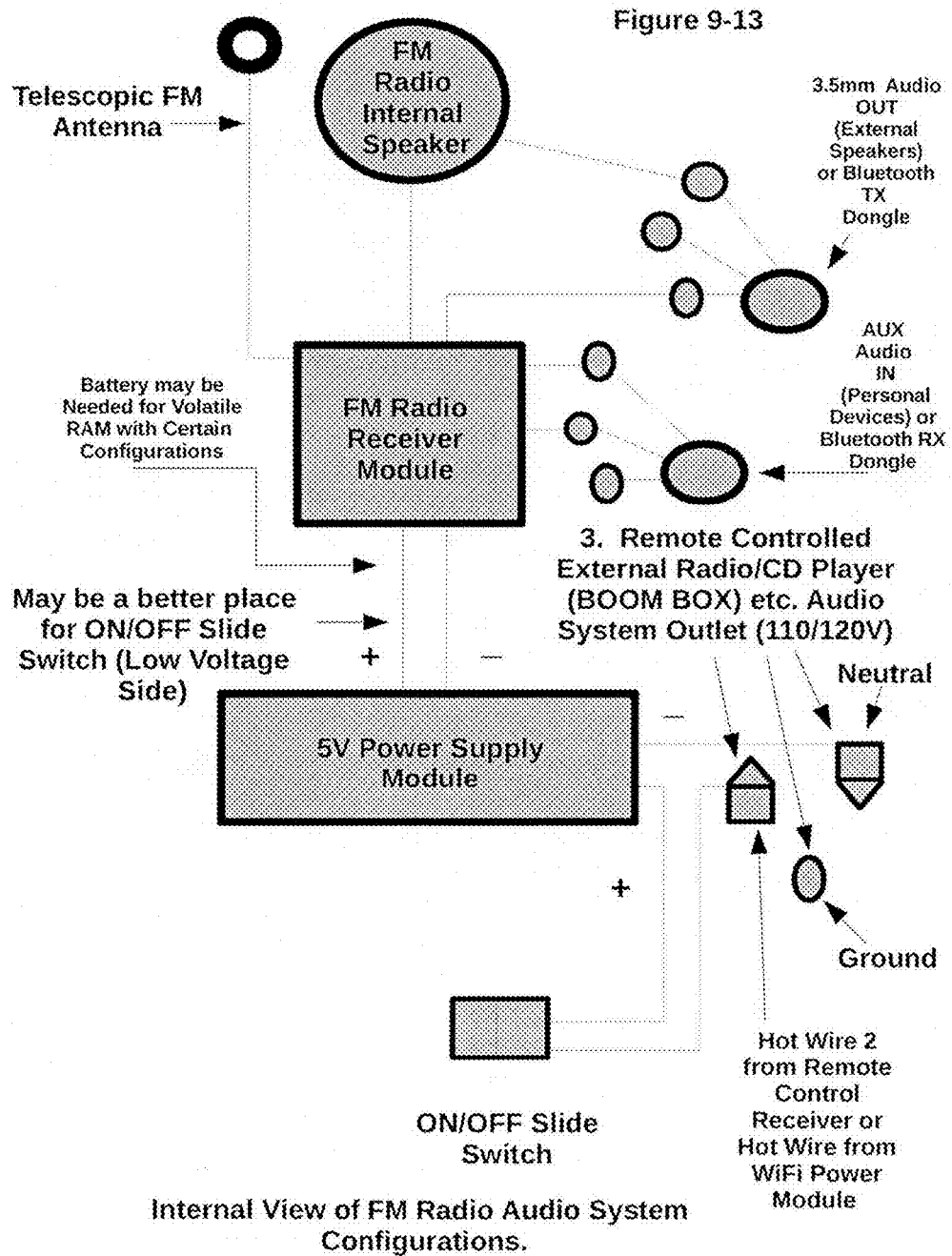
Figures 11, 12, 13:
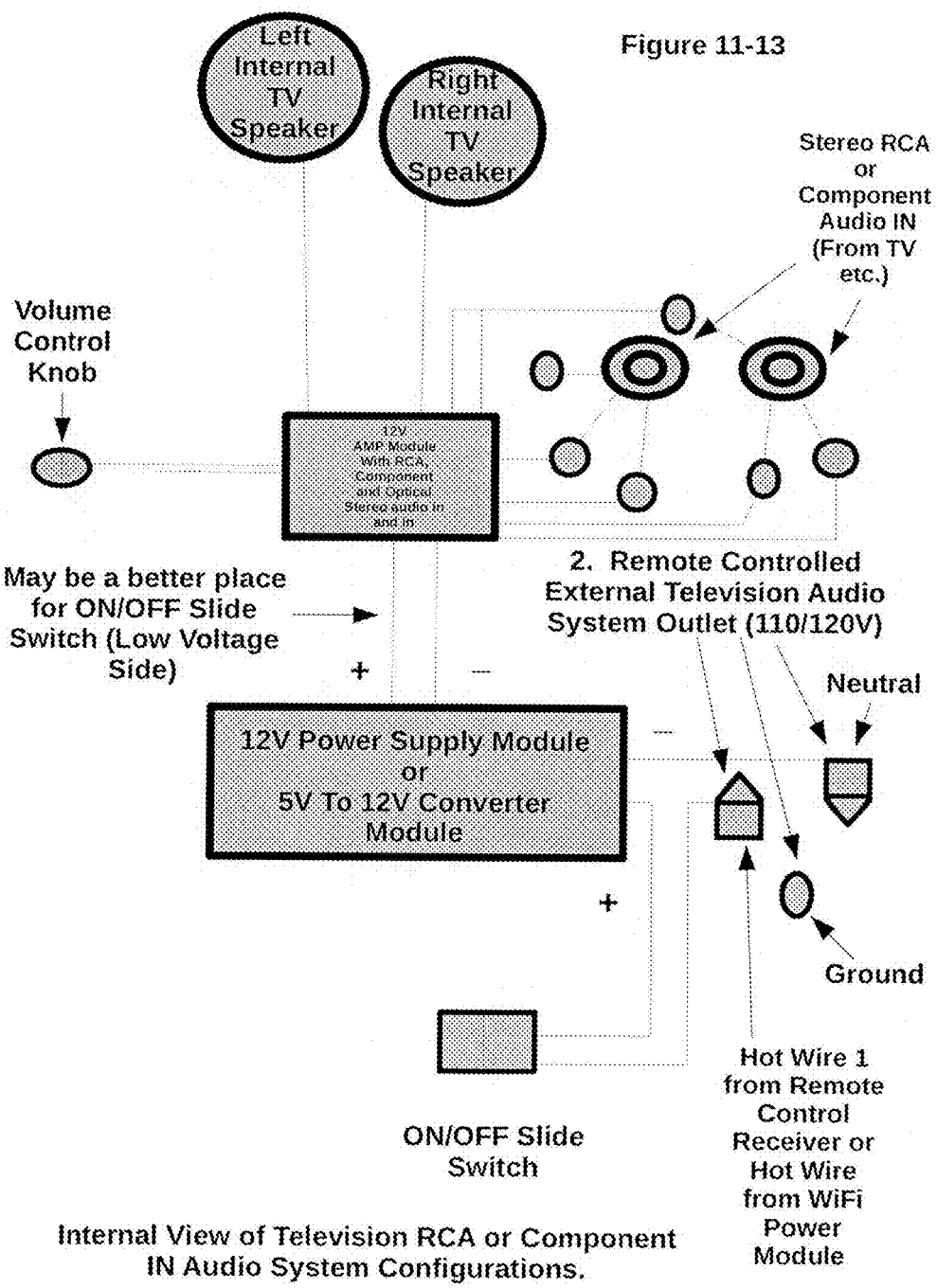
Figures 12, 13:
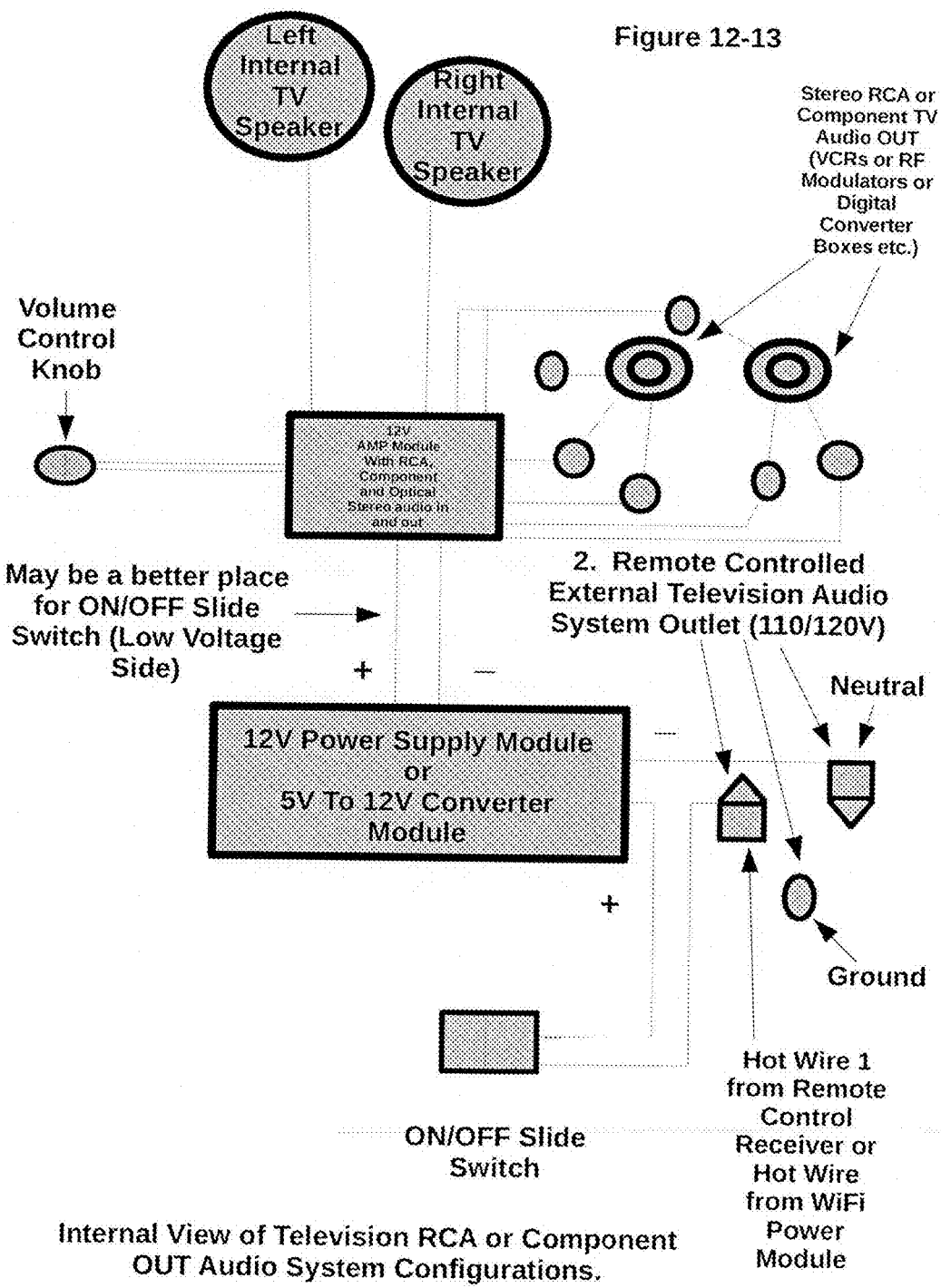
Figure 13:
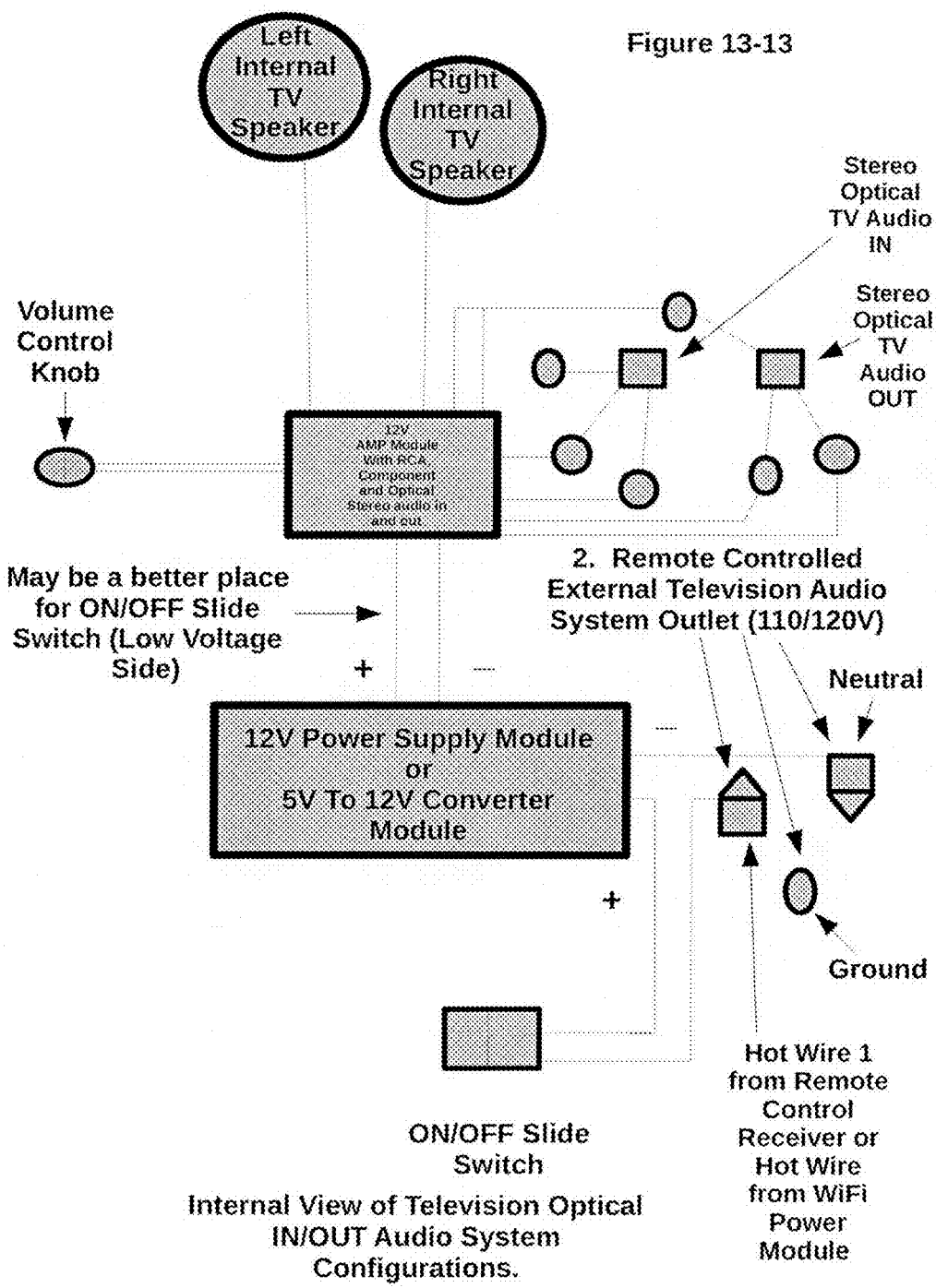

Indeed, the Television Commercial Silencer Electrical Wall Outlet Receptacle Tap may be embodied in many different forms and should not be construed as limited to the embodiment's set forth herein; rather, these embodiment's are provided so that this disclosure will satisfy applicable legal requirements, wherein:

FIG. 1-13 illustrates the general appearance of what a mass produced unit may look like. The unit would be similar in size to a commonly used multiple outlet or surge protector residential power tap.

FIG. 2-13 illustrates a general side view of such a device. Again, not to scale. The width of a mass produced unit would be as small as possible.

FIG. 3-13 illustrates the hand held remote control for the manufactured device and except for scale would look almost like the figure (Inclusion of WiFi modules within the unit will permit remote control of the unit's audio outlets via a smart phone).

FIG. 4-13 illustrates a breakdown of features and functions by the number. The specific details of each numbered component are provided on a separate page later in this Utility Patent Application (Non Provisional).

FIG. 5-13 illustrates again a general side view of such a device with emphasis that the manufactured device will be compact and convenient and able to plug into a standard 110/120 volt wall outlet receptacle.—Portable enough to take along on road trips and to motels.

FIG. 6-13 illustrates a breakdown of the functions that the hand held remote control will provide, by the numbers. (Again, with inclusion of WiFi modules within the unit, the remote controlled outlets may be managed via a smart phone.—Inclusion of the Voice Commands API and technology such as "Bluetooth Smart" during APP development will allow for Voice Control and Auto Detection and Configuration of audio devices near by the Television Commercial Silencer Electrical Wall Outlet Receptacle Tap).

FIG. 7-13 illustrates a detailed internal view of the outlet configurations for the Television Commercial Silencer Electrical Wall Outlet Receptacle Tap, showing the wiring diagrams for the three remote controlled outlets and the three always hot or WiFi enabled outlets or Voice enabled outlets (implying, there will be: "An APP for that"—Inclusion of the Voice Commands API during APP development will allow for Voice Control of the Television Commercial Silencer Electrical Wall Outlet Receptacle Tap) as well as how the remote controlled outlets and power supply connect to the remote control, WiFi control or Voice control receiver module(s) inside the Television Commercial Silencer Electrical Wall Outlet Receptacle Tap.

FIG. 8-13 illustrates the internal view of the components and wiring necessary for the Television Commercial Silencer Electrical Wall Outlet Receptacle Tap to produce its own stereo television sound via 3.5 mm ports directly from the unit with the option of utilizing one's own external speakers or audio system of choice.

FIG. 9-13 illustrates the internal view of the components and wiring necessary for the Television Commercial Silencer Electrical Wall Outlet Receptacle Tap to produce its own FM radio sound directly from the unit with the option of utilizing one's own external speakers or audio system of choice, including a personal computer's (PC) audio system.

FIG. 10-13 illustrates the internal view of the components and wiring necessary for the Television Commercial Silencer Electrical Wall Outlet Receptacle Tap to produce its own MP3/MP4 sound directly from the unit with the option of utilizing one's own external speakers or audio system of choice.

FIG. 11-13 illustrates the internal view of the components and wiring necessary for the Television Commercial Silencer Electrical Wall Outlet Receptacle Tap to produce its own stereo television sound via RCA and Component Audio IN Ports directly from the unit with the option of utilizing one's own external speakers or audio system of choice.

FIG. 12-13 illustrates the internal view of the components and wiring necessary for the Television Commercial Silencer Electrical Wall Outlet Receptacle Tap to produce and pass through its own stereo television sound via RCA and Component Audio OUT Ports directly from the unit with the option of utilizing one's own external speakers or audio system of choice.

FIG. 13-13 illustrates the internal view of the components and wiring necessary for the Television Commercial Silencer Electrical Wall Outlet Receptacle Tap to produce and pass through its own stereo television sound via Optical Audio IN/Out Ports directly from the unit with the option of utilizing one's own external speakers or audio system of choice. Finally, the two pages following FIG. 13-13 are the Figure Number Descriptions.

DETAILED DESCRIPTION OF THE INVENTION

The terminology used herein is for the purpose of describing particular embodiment's only and is not intended to be limiting of the Television Commercial Silencer Electrical Wall Outlet Receptacle Tap (Invention).

The exterior of such a plug-in unit should comprise of at least three low voltage remote controlled power outlets specifically designed for external speakers or audio systems. These low voltage outlets should not be considered standard power outlets and shall be labeled as such. On the other hand, such a plug-in unit should also comprise of at least three standard 110/120 volt and/or WiFi enabled power outlets and shall be labeled as such.

The FM radio controls on the exterior of such a unit may vary slightly based on radio module cost, selection and availability during manufacturing but the module selection will not limit the units functionality and purpose. The same applies to the MP3/MP4 module, [Component and Composite Audio Modules], [Optical Audio Modules], [WiFi modules], [Bluetooth Modules], [Voice Control Modules] and various electrical and electronic components, as well as the poly case selection, cut-outs and label printing.

The goal is to place the invention into a compact easy to use practical package for mass production for even a novice to appreciate as well as provide the most extensible set of features and options to put the end user in complete control. I believe that this package provides said.

The unit is completely self contained and can operate on its own by simply plugging the unit into a standard wall outlet and making one connection or Wireless via Bluetooth. Either plug in a 3.5 mm headphone cable from one's television to the 3.5 mm audio in port on the unit or utilize one of the multiple available audio ports on the exterior of the unit or plug one's television audio system's power cable into: 2. Remote Controlled External Television Audio System Outlet on the unit (See Television Commercial Silencer Electrical Wall Outlet Receptacle Tap Function Numbering Details).—On Bluetooth enabled Televisions or via on-board Bluetooth or external dongle, no wired connection is required. (Bluetooth speakers sold separately)

One will then have the option of silencing television commercials and listening to their favorite radio station instead, without any further configuration (other then tuning the internal radio to their favorite station and perhaps extending the external FM radio antenna for adequate reception).

It's when the end user desires more that the configuration possibilities for the Television Commercial Silencer Electrical Wall Outlet Receptacle Tap become quite extensive. As a matter of fact, It would not be possible to cover all of the different audio device configuration possibilities in this application. This compact unit should allow for the configuration of virtually any end user's desired audio setup.

(May also use Bluetooth dongle for additional options and functions: e.g., a 3.5 mm Bluetooth dongle receiver inserted into the AUX port of the Television Commercial Silencer Electrical Wall Outlet Receptacle Tap will provide features such as: connecting one's smart phone wireless to the Television Commercial Silencer Electrical Wall Outlet Receptacle Tap allowing for playback of one's mp3 collection residing on one's phone, audio books or even online content from YouTube™).

Furthermore, don't forget that one's smart phone can also serve as the hand held remote control for the Television Commercial Silencer Electrical Wall Outlet Receptacle Tap. Many more configuration options will be included in the Stage 5 Manual. Please stay "tuned!"

P.S. To the manufacturer's, an RF modulator specially designed for the Television Commercial Silencer Electrical Wall Outlet Receptacle Tap will also provide not just e.g., YouTube™ audio but also video via the Television Commercial Silencer Electrical Wall Outlet Receptacle Tap. Thus, YouTube™ audio and video e.g. could be presented to the End User during Television Commercial breaks. [In conclusion, utilizing a "Computer in a Box" such as a "Cubieboard™" possibilities are extensive and the future of the Television Commercial Silencer Electrical Wall Outlet Receptacle Tap is bright!

Also, remember that if one's Television does not have built-in Bluetooth capabilities but has a headphone jack, one can plug a Bluetooth transmitter dongle into one's Television headphone jack or various other audio ports on the exterior of one's Television based on manufacturer. In addition, even the oldest analog televisions that are still using analog to digital converter boxes can still benefit from the Television Commercial Silencer Electrical Wall Outlet Receptacle Tap via RCA cables and/or an RF modulator if need be. There will be a solution for virtually every audio setup.

The unit is designed from the simple to the complex. One can plug the unit in and listen to their television through the units' two internal stereo speakers or plug in their own external speakers. If the end user chooses to use amplified speakers, they would simply plug the 3.5 mm plug from their external speakers into the television audio OUT port on the front of the unit and the external amplified speaker's power cord into: addition, if the end user prefers to listen to their television through their television external audio system or home entertainment system, simply plug the respective power cord into: 2. Remote Controlled External Television Audio System Outlet.

The foregoing also applies to: 3. Remote Controlled External Radio/CD Player (BOOM BOX) etc. Audio System Outlet and 4. Remote Controlled External MP3/MP4 Player etc. Audio System Outlet. The end user can also listen to their favorite MP3/MP4 music "Out of the Box" so to speak by simply plugging in a "FLASH" (USB) drive containing their own music into the front of the unit, if they prefer; or, as with the unit's internal stereo television audio speakers and internal radio, the end user can slide a switch on the front of the unit to turn off respectively each of the unit's internal audio devices entirely and plug in their own, in the respective: Remote Controlled External Audio System Outlet.

The invention claimed is:

1. A television commercial silencer comprising:
an electrical outlet receptacle having a first outlet and a second outlet;
a switch connected to the first outlet and second outlet;
said switch having a first position, a second position and a third position;
wherein when said switch is in the first position, the first outlet is on and the second outlet is off;
wherein when said switch is in the second position, the first outlet is off and the second outlet is off;
wherein when said switch is in the third position, the first outlet is off and the second outlet is on;
said first outlet being connected to at least one speaker connected to a television;
said second outlet being connected to an audio device; and
said audio device is connected to the television commercial silencer via an audio cable.

2. The television commercial silencer of claim 1 further comprising:
a switch for turning said audio cable on and off.

3. A television commercial silencer comprising:
an electrical outlet receptacle having a first outlet and a second outlet;
a switch connected to the first outlet and second outlet;
said switch having a first position, a second position and a third position;
wherein when said switch is in the first position, the first outlet is on and the second outlet is off;
wherein when said switch is in the second position, the first outlet is off and the second outlet is off;
wherein when said switch is in the third position, the first outlet is off and the second outlet is on;
said first outlet being connected to at least one speaker connected to a television;
said second outlet being connected to an audio device; and
said audio device is connected to the television commercial silencer via a wireless connection.

4. The television commercial silencer of claim 3 further comprising:
a switch for turning said wireless connection on and off.

5. A television commercial silencer comprising:
an electrical outlet receptacle having a first outlet and a second outlet;
a switch connected to the first outlet and second outlet;
said switch having a first position, a second position and a third position;
wherein when said switch is in the first position, the first outlet is on and the second outlet is off;
wherein when said switch is in the second position, the first outlet is off and the second outlet is off;
wherein when said switch is in the third position, the first outlet is off and the second outlet is on;
said first outlet being connected to at least one speaker connected to a television;
said second outlet being connected to an audio device; and
said at least one speaker connected to said television is connected to the television commercial silencer via an audio cable.

6. The television commercial silencer of claim 5 further comprising:
a switch for turning said audio cable on and off.

7. A television commercial silencer comprising:
an electrical outlet receptacle having a first outlet and a second outlet;
a switch connected to the first outlet and second outlet;
said switch having a first position, a second position and a third position;
wherein when said switch is in the first position, the first outlet is on and the second outlet is off;
wherein when said switch is in the second position, the first outlet is off and the second outlet is off;
wherein when said switch is in the third position, the first outlet is off and the second outlet is on;
said first outlet being connected to at least one speaker connected to a television;
said second outlet being connected to an audio device; and
said at least one speaker connected to said television is connected to the television commercial silencer via a wireless connection.

8. The television commercial silencer of claim 7 further comprising:
a switch for turning said wireless connection on and off.

* * * * *